(12) United States Patent
Gottschall

(10) Patent No.: US 11,708,055 B2
(45) Date of Patent: Jul. 25, 2023

(54) VACUUM CLEANER ASSEMBLY

(71) Applicant: SHOP VAC CORPORATION, Williamsport, PA (US)

(72) Inventor: Jason Gottschall, South Williamsport, PA (US)

(73) Assignee: SHOP VAC CORPORATION, Williamsport, PA (US)

(*) Notice: Subject to any disclaimer, the term of this patent is extended or adjusted under 35 U.S.C. 154(b) by 744 days.

(21) Appl. No.: 16/556,385

(22) Filed: Aug. 30, 2019

(65) Prior Publication Data

US 2020/0101946 A1 Apr. 2, 2020

Related U.S. Application Data

(60) Provisional application No. 62/737,714, filed on Sep. 27, 2018.

(51) Int. Cl.
| | |
|---|---|
| *B60S 1/64* | (2006.01) |
| *A47L 9/14* | (2006.01) |
| *F04D 29/40* | (2006.01) |
| *E05B 65/00* | (2006.01) |
| *F04D 29/70* | (2006.01) |
| *F04D 29/08* | (2006.01) |

(52) U.S. Cl.
CPC ............... *B60S 1/64* (2013.01); *A47L 9/1409* (2013.01); *E05B 65/006* (2013.01); *F04D 29/083* (2013.01); *F04D 29/403* (2013.01); *F04D 29/701* (2013.01)

(58) Field of Classification Search
CPC ........ B60S 1/64; A47L 9/1409; E05B 65/006; F04D 29/083; F04D 29/403; F04D 29/701
See application file for complete search history.

(56) References Cited

U.S. PATENT DOCUMENTS

| | | |
|---|---|---|
| 7,247,182 B2 | 7/2007 | Boyer, Jr. et al. |
| 7,480,957 B2 | 1/2009 | Ganzenmuller, V |
| 10,099,659 B1 | 10/2018 | Williams et al. |

FOREIGN PATENT DOCUMENTS

EP 1991100 B1 11/2017

*Primary Examiner* — Andrew A Horton
(74) *Attorney, Agent, or Firm* — Marshall, Gerstein & Borun LLP

(57) ABSTRACT

A vacuum cleaner assembly configured to be mounted in a vehicle. The vacuum cleaner assembly including a vacuum unit configured to draw a vacuum, a canister assembly configured to collect debris and coupled to the vacuum unit, a hose junction configured to serve as a pathway for debris, and a chassis connecting the hose junction to the canister assembly. A pathway through the vacuum cleaner assembly may turn 180 degrees in the hose junction. A dirty air port of the canister assembly may be disposed at an angle relative to a surface of the chassis to facilitate placement and removal of the canister assembly.

21 Claims, 11 Drawing Sheets

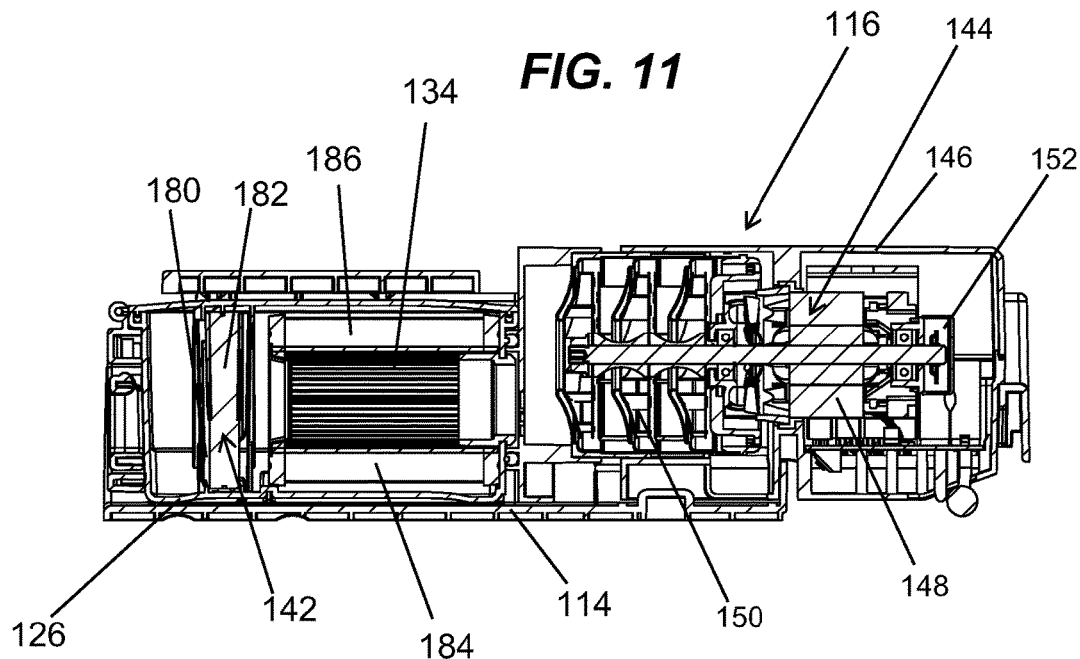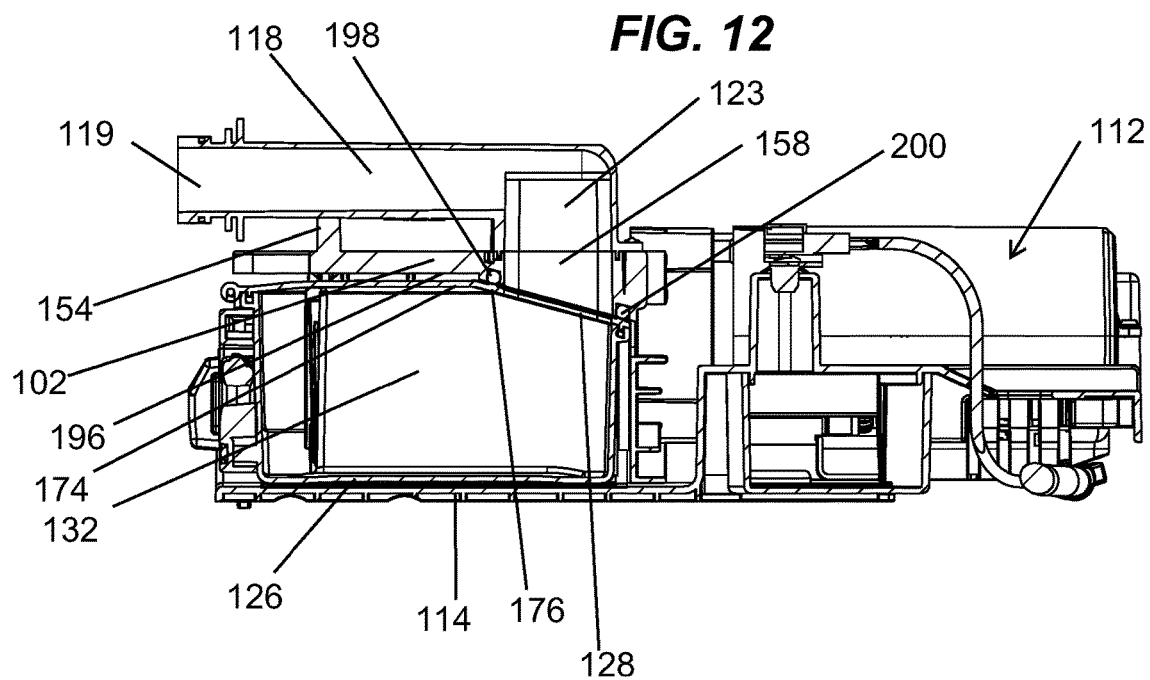

VACUUM CLEANER ASSEMBLY

CROSS-REFERENCE TO RELATED APPLICATIONS

This application claims the benefit of U.S. Provisional Application No. 62/737,714 filed Sep. 27, 2018, the entire contents of which are incorporated herein by reference in their entirety.

FIELD OF THE INVENTION

The present invention relates generally to a vacuum cleaner assembly configured for placement in a vehicle and, more particularly, to a vacuum cleaner assembly configured for placement in a vehicle that includes a vacuum unit, a canister assembly, a hose junction, and a chassis.

BACKGROUND OF THE INVENTION

In order to clean a vehicle, such as a car or truck, a vacuum cleaner is often used to vacuum out dirt and debris. However, it can be awkward and/or inconvenient to use a typical in-home vacuum cleaner to clean out the interior of a vehicle. To address this inconvenience, attempts have been made to permanently install on-board vehicle vacuum cleaners inside the vehicle. However, the known on-board vehicle vacuum cleaners typically have a complex and dedicated installation arrangement, which limits the usage across different vehicles and/or in different arrangements within a vehicle. Further, once installed, some components of the vacuum cleaners move around during vehicle use and/or are not adequately secured, increasing risk that debris from the vacuum cleaner may be unintentionally spilled in the vehicle.

In addition, removal of the vacuum cleaner in a dedicated installation arrangement within the vehicle may be time consuming and difficult. For example, it is often difficult for users to access one or more devices or parts used to help remove the vacuum cleaner from a desired location, such as to remove debris collected in the vacuum cleaner, particularly without spilling the debris. In addition, while some parts may be relatively accessible, they can be heavy or cumbersome to handle, further adding to the difficulties in removing such vacuum cleaners from various positions within a vehicle.

SUMMARY OF THE DISCLOSURE

In accordance with a first exemplary aspect of the disclosure, a vacuum cleaner assembly configured to be mounted in a vehicle comprises a vacuum unit configured to draw a vacuum, a canister assembly configured to collect debris, a hose junction configured to serve as a pathway for debris, and a chassis configured to fluidly connect the hose junction to the canister assembly. The vacuum unit includes a power source. The canister assembly is coupled to the vacuum unit and includes a canister having a dirty air port. The hose junction includes a first dirty air opening and a second dirty air opening. The chassis includes a dirty air aperture and a surface, and the chassis fluidly connects the second air opening of the hose junction to the dirty air port of the canister assembly. The dirty air port of the canister assembly is disposed at an angle relative to the surface of the chassis to facilitate placement and removal of the canister assembly.

In accordance with a second exemplary aspect of the disclosure, a vacuum cleaner assembly configured to be mounted in a vehicle comprises a vacuum unit configured to draw a vacuum, a canister assembly configured to collect debris, a hose junction configured to serve as a pathway for debris, a chassis connecting the hose junction to the canister assembly, and a mounting plate on which the canister assembly and the vacuum unit are disposed. The vacuum unit includes a power source, and the canister assembly is coupled to the vacuum unit. The canister assembly includes a canister that defines a cavity and further includes a dirty air port and a clean air port. A cartridge filter is disposed within the cavity of the canister and surrounds the clean air port. The hose junction includes a first dirty air opening and a second dirty air opening. The chassis includes a dirty air aperture between the second dirty air opening of the hose junction and the dirty air port of the canister. The vacuum cleaner assembly includes a pathway whereby a fluid enters the first dirty air opening of the hose junction, exits the second dirty air opening of the hose junction, passes through the dirty air aperture of the chassis, enters the cavity of the canister via the dirty air port of the canister, and exits the canister via the clean air port after traveling through the cartridge filter.

In further accordance with any one or more of the exemplary aspects, the vacuum cleaner assembly optionally may include any one or more of the following preferred forms.

In some preferred forms, the angle of the dirty air aperture of the canister relative to the surface of the chassis may be greater than or equal to fifteen degrees. A worm gasket may be provided between the dirty air port of the canister assembly and the dirty air aperture of the chassis to provide a seal. The first dirty air opening of the hose junction may be disposed perpendicular to the second dirty air opening of the hose junction.

In other preferred forms, the vacuum cleaner assembly may further comprise a mounting plate, and the canister assembly and the vacuum unit may be disposed on the mounting plate. The canister assembly may be slidably mounted in the mounting plate. The chassis may further comprise a hose support configured to support the hose junction.

In still other preferred forms, the canister assembly may include a lid and the dirty air port may be located in the lid. The lid may include a first surface adjacent to the surface of the chassis when the vacuum cleaner assembly is assembled, and a second surface comprising the dirty air port. A worm gasket may be provided between the dirty air port of the canister assembly and the dirty air aperture of the chassis to provide a seal. The worm gasket may have a first side and a second side. The first side of the worm gasket may be closer to the first surface of the lid than the second side of the worm gasket is when the vacuum cleaner assembly is assembled.

In other preferred forms, a pre-filter may be disposed in the cavity of the canister. The pre-filter and the canister together may define a first chamber and a second chamber of the cavity. The cartridge filter may be disposed within the second chamber of the cavity. The pathway may allow air to enter the first chamber of the cavity of the canister via the dirty air port of the canister and enter the second chamber of the cavity of the canister after traveling through the pre-filter.

In still other preferred forms, the dirty air aperture of the chassis may be disposed on one of a top surface of the chassis or a rear surface of the chassis.

In still other preferred forms, the canister assembly may be slidably mounted in the mounting plate. The dirty air port of the canister assembly may be disposed at an angle relative to the surface of the chassis to facilitate placement and removal of the canister assembly during debris removal from the canister assembly. The canister assembly may further include a front panel connected to the canister and a handle latch connected to the canister and surrounded in part by the front panel. The canister assembly further may further comprise a latch lock and a latch lock blade connected to the handle latch for locking the handle latch. The canister may include a lid, the chassis may be secured to the canister above the lid, and the chassis may include a projection extending toward the front panel of the canister.

In other preferred forms, the hose junction may be configured to turn the pathway 180 degrees between the first dirty air opening and the second dirty air opening. The canister may include a back wall and the chassis may be secured to the back wall of the canister and to the vacuum unit. In other preferred forms, the canister includes a lid, and the chassis may be secured to the canister above the lid. In still other preferred forms, the hose junction may be configured to turn the pathway 90 degrees between the first dirty air opening and the second dirty air opening.

Additional optional aspects, arrangements, forms, and/or advantages of the vacuum cleaner assemblies disclosed herein will be apparent upon consideration of the following detailed description and the appended drawings, each different functionally operable and technically effective combination of which is expressly included as a part of the present disclosure.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein:

FIG. 11 is a cross-sectional view of the vacuum cleaner assembly of FIG. 7 along line A-A; and FIG. 12 is a cross-sectional view of the vacuum cleaner assembly of FIG. 7 along line B-B.

DETAILED DESCRIPTION

Vacuum cleaner assemblies configured to be mounted in a vehicle for easy removal and sealing placement when in use are disclosed. The vacuum cleaner assemblies include a vacuum unit configured to draw a vacuum, a canister assembly operably connected to the vacuum unit and configured to collect debris, a hose junction for attaching vacuum accessories (such as a vacuum head or brush), and a chassis to connect the hose junction to the canister assembly. The vacuum cleaner assemblies permit the canister assembly to be sealingly connected to and part of a pathway (formed by the various components of the vacuum cleaner assembly) for collection of debris when vacuuming, while still allowing easy removal of the canister assembly to, for instance, dump out collected debris. In one arrangement, the optimal pathway includes a 180 degree turn within the hose junction. The canister assembly may have a dirty air port that is disposed at an angle relative to the surface of the chassis. So configured, the canister assembly does not contact a sealing component between the chassis and the canister assembly, such as a worm gasket, until the canister assembly is pushed all the way in place. As a result, the canister assembly is able to slide without undue friction when being removed or put back in place, while also ensuring a sealed pathway when the vacuum cleaner assembly is in use.

Referring now to FIGS. 1-6, a vacuum cleaner assembly 10 according to a first aspect of the present disclosure is depicted. The vacuum cleaner assembly 10 includes a vacuum unit 12 and a mounting plate 14, and the vacuum unit 12 is coupled to the mounting plate 14. The vacuum cleaner assembly 10 is configured to be installed and operated within a vehicle, such as a sports utility vehicle or other type of vehicle.

Figure 1:
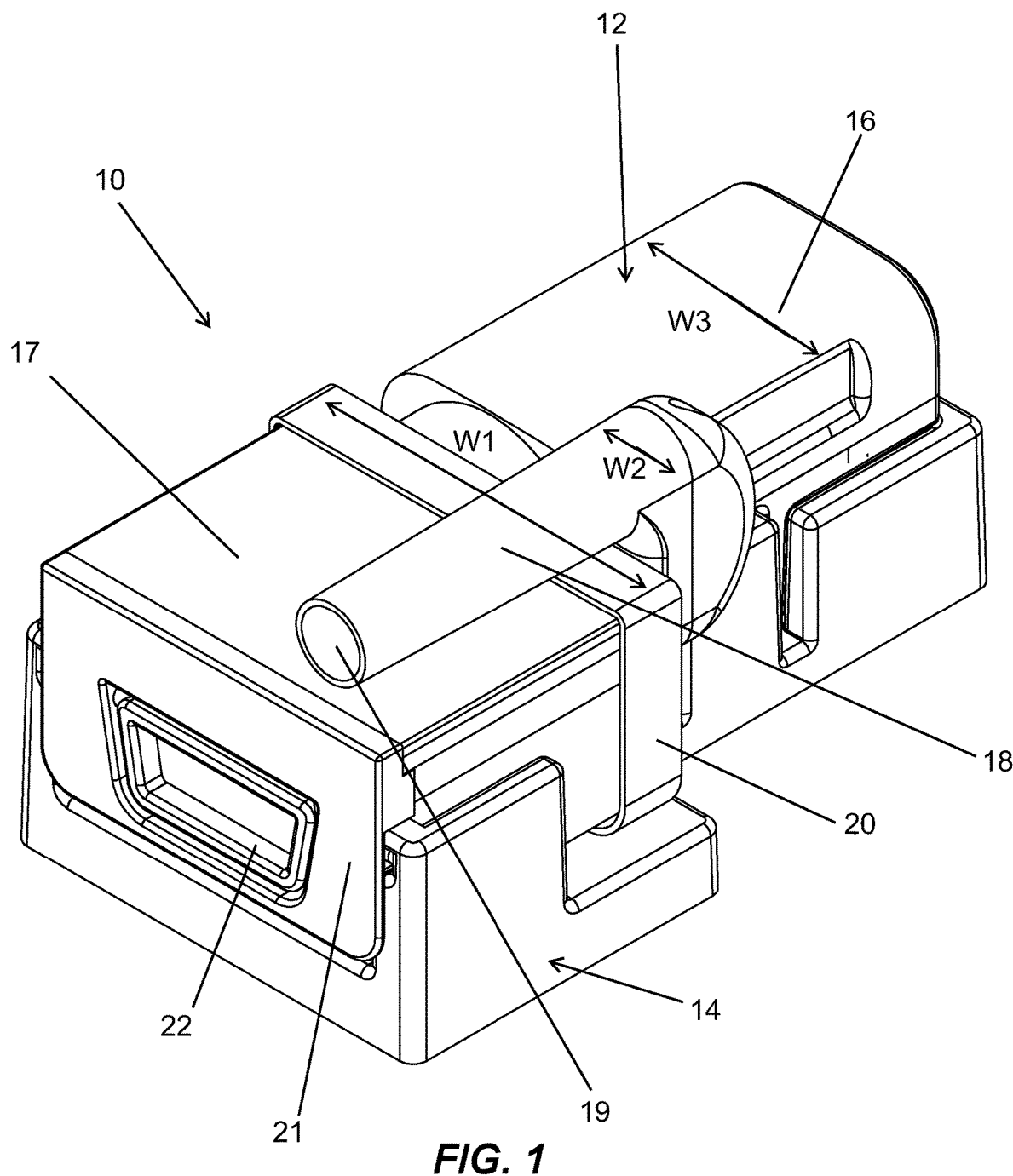
FIG. 1 is an isometric view of a vacuum cleaner assembly to be mounted in a vehicle according to a first aspect of the present disclosure.

As shown in FIG. 1, the vacuum unit 12 includes a power unit 16, for example a motor, which creates a vacuum for operation of the vacuum cleaner assembly 10, as explained more below. The power unit 16 may include a battery, possibly rechargeable, or may be hardwired into the vehicle so as to draw electrical power from the vehicle. The power unit 16 is operably connected to a canister assembly 17, which is secured by a chassis 20. The chassis 20 further secures the canister assembly 17 to a hose junction 18. The hose junction 18 includes a dirty air opening, such as a first dirty air opening 19. In addition, the hose junction 18 permits the vacuum cleaner assembly 10 to be connected to a variety of vacuum accessories, such as a vacuum head or brush, at or near the first dirty air opening 19 of the hose junction 18.

As also shown in FIG. 1, the canister assembly 17, which may be configured to slide on mounting plate 14, is prevented from sliding by a front panel 21 having a handle latch 22. To access the canister assembly 17, a user may operate the handle latch 22 to rotate or remove the front panel 21, as explained more below.

Figure 2:
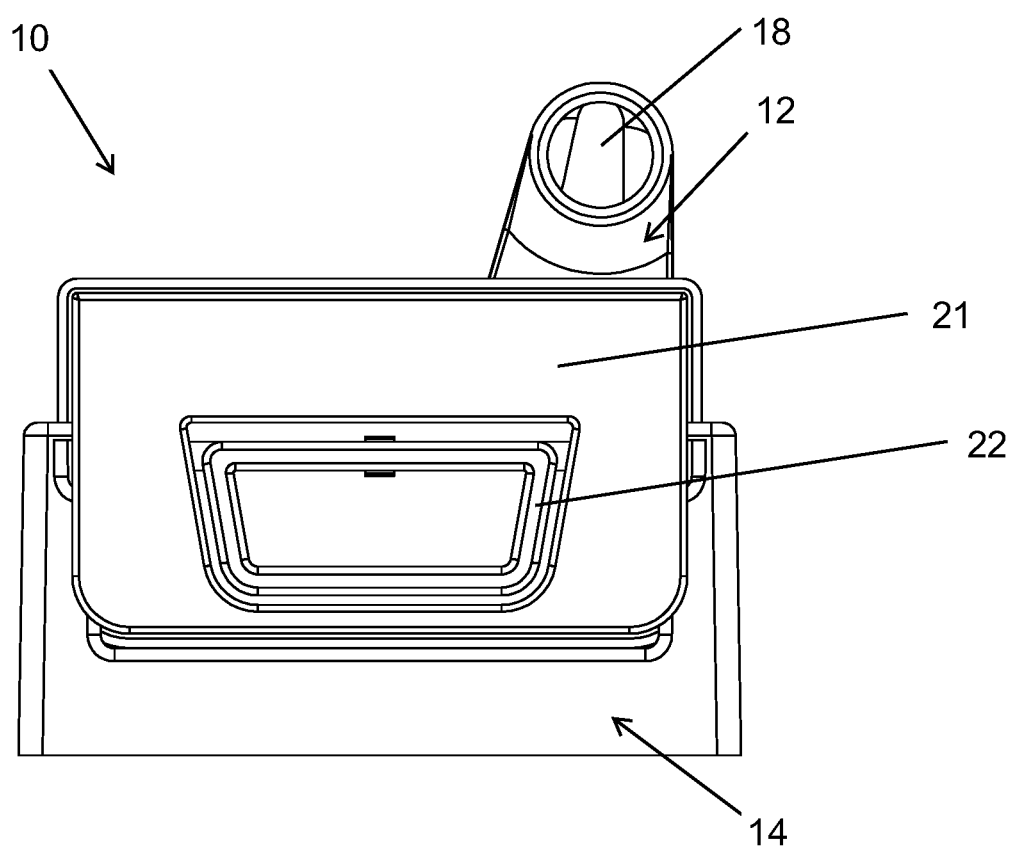
FIG. 2 is a front view of the vacuum cleaner assembly of FIG. 1.

Referring now to FIG. 2, the front view of the front panel 21 and the handle latch 22 are depicted. As shown in FIG. 2, the front panel 21 surrounds the handle latch 22. However, in other arrangements not herein depicted, the handle latch 22 may only be partially surrounded by the front panel 21 or the front panel 21 may only be present along one side of the handle latch 22, such as above or below the handle latch 22.

Figure 3:
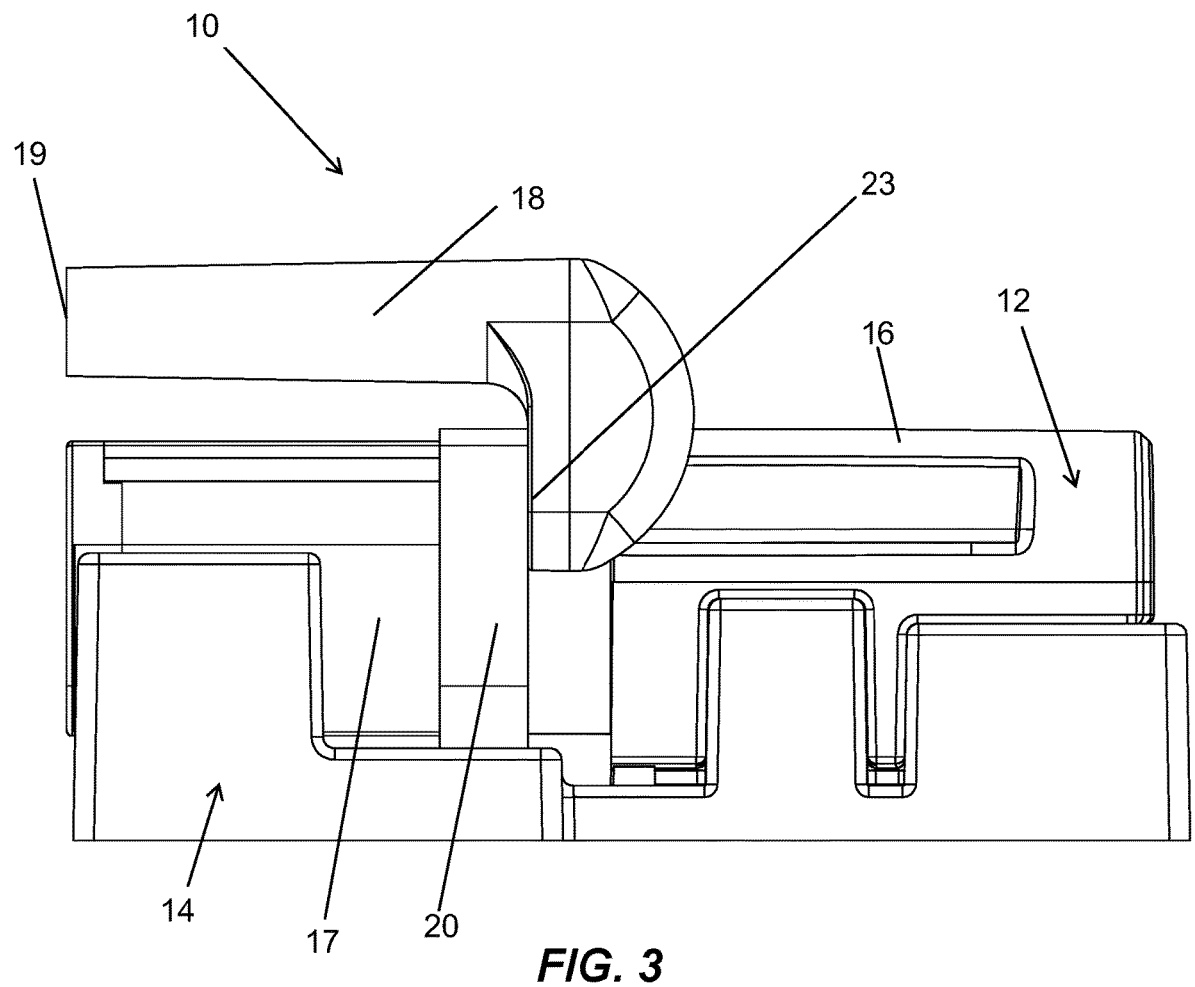
FIG. 3 is a side view of the vacuum cleaner assembly of FIG. 1.

Referring now to FIG. 3, the hose junction 18 may have a 180 degree turn. That is, air and debris may enter the hose junction 18 in a first direction and exit the hose junction 18 in a second direction that is opposite the first direction. Specifically, as shown in FIG. 3, the air and debris may enter the hose junction 18 at the first dirty air opening 19 and may exit the hose junction 18 at the second dirty air opening 23.

Figure 4:
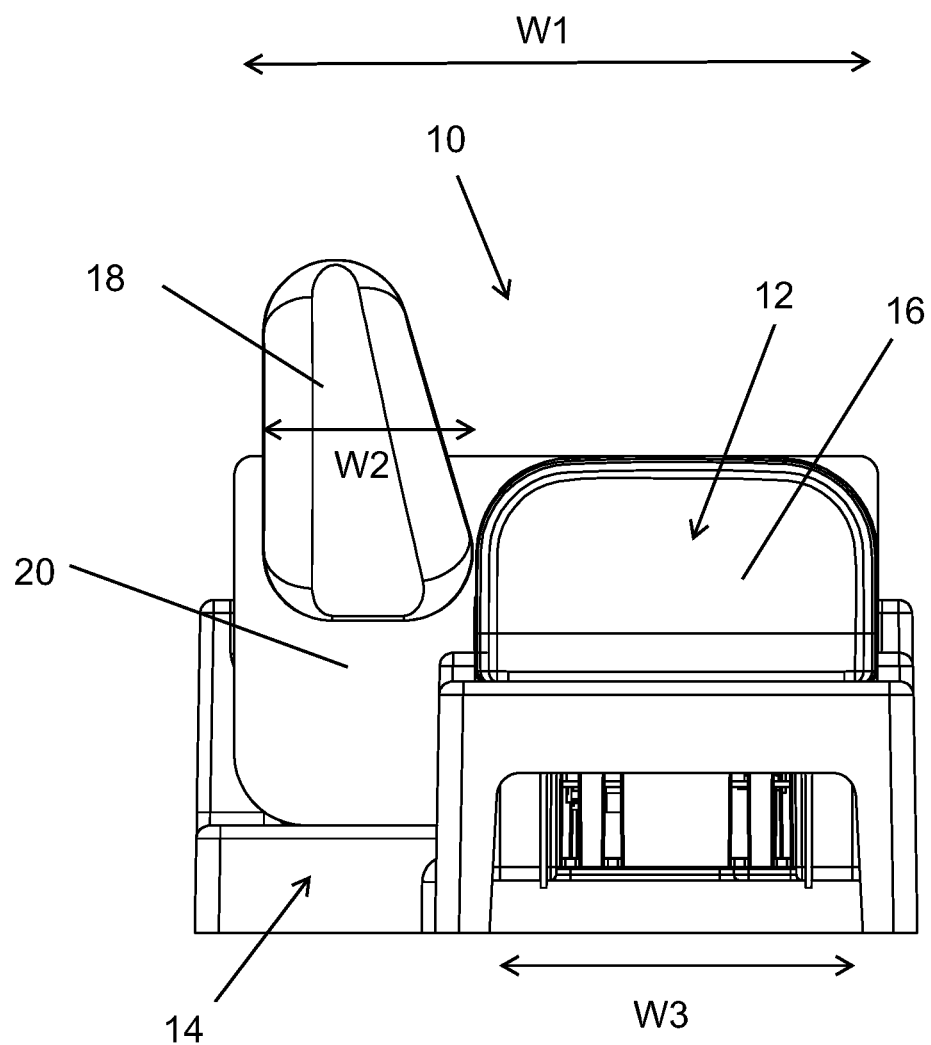
FIG. 4 is a rear view of the vacuum cleaner assembly of FIG. 1.
Figure 5:
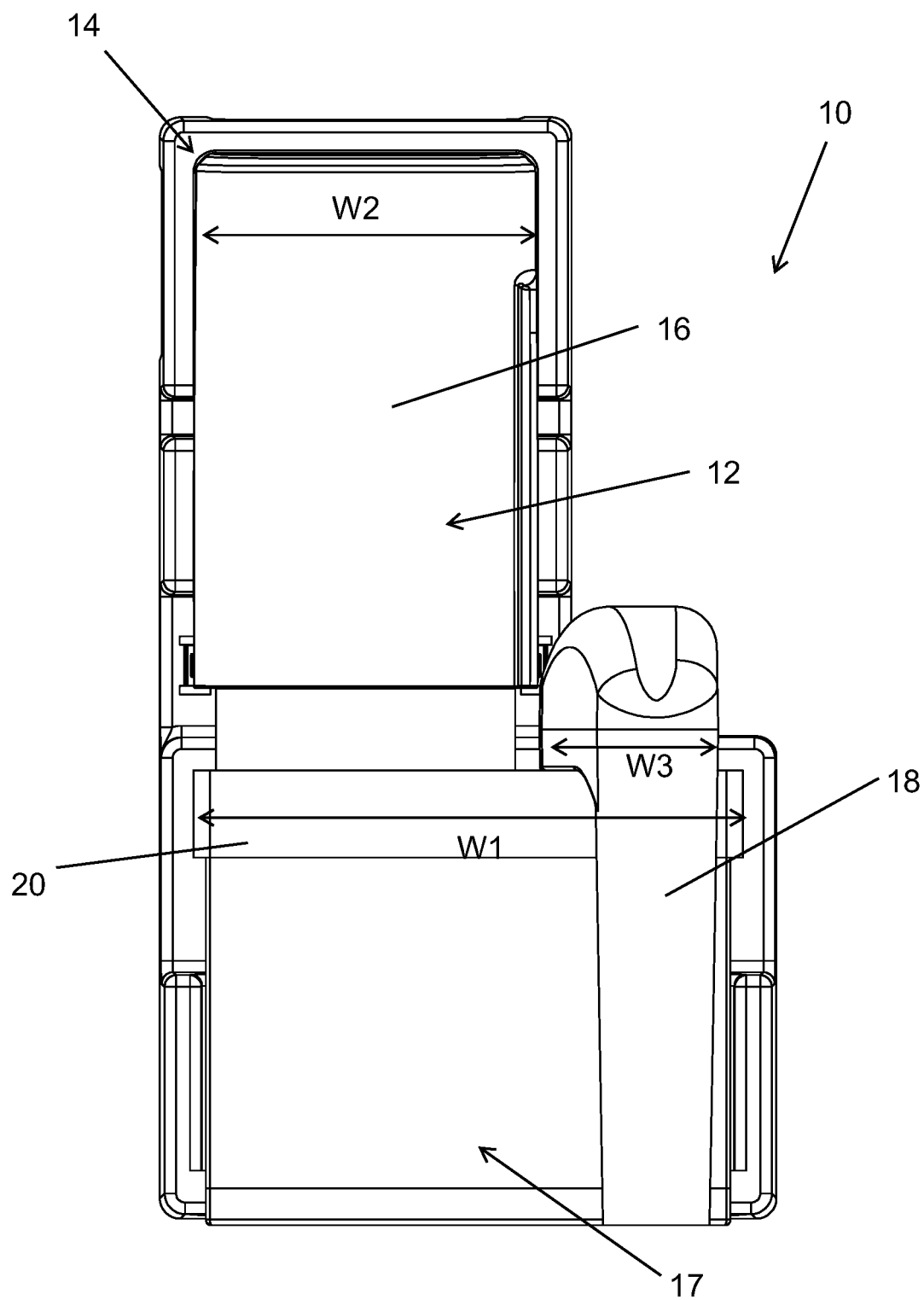
FIG. 5 is a top view of the vacuum cleaner assembly of FIG. 1.

As shown in FIGS. 1, 4, and 5, the vacuum unit 12 having the power unit 16 may be narrower than the chassis 20 and canister assembly 17. More specifically, and in this example as shown in FIG. 4, the chassis 20 has a width W1, the hose junction 18 has a width W2, and the power unit 16 has a width W3. The width W3 of the power unit 16 is less than the width of the chassis 20, but is greater than the width W2 of the hose junction 18. This configuration allows the hose junction 18 to occupy space along one side of the power unit 16 while still permitting the width W2 of the hose junction 18 combined with the width W3 of the power unit 16 to be less than or equal to the width W1 of the chassis 20. As a result, the vacuum cleaner assembly 10 is able to fit neatly into a space within the vehicle having a constant width. The mounting plate 14 may be designed to be complimentary to the various widths W1, W2, and W3. As best shown in FIG. 5, the mounting plate 14 may have a slightly larger footprint than that of the power unit 16, the chassis 20, the canister assembly 17, and the hose junction 18.

Figure 6:
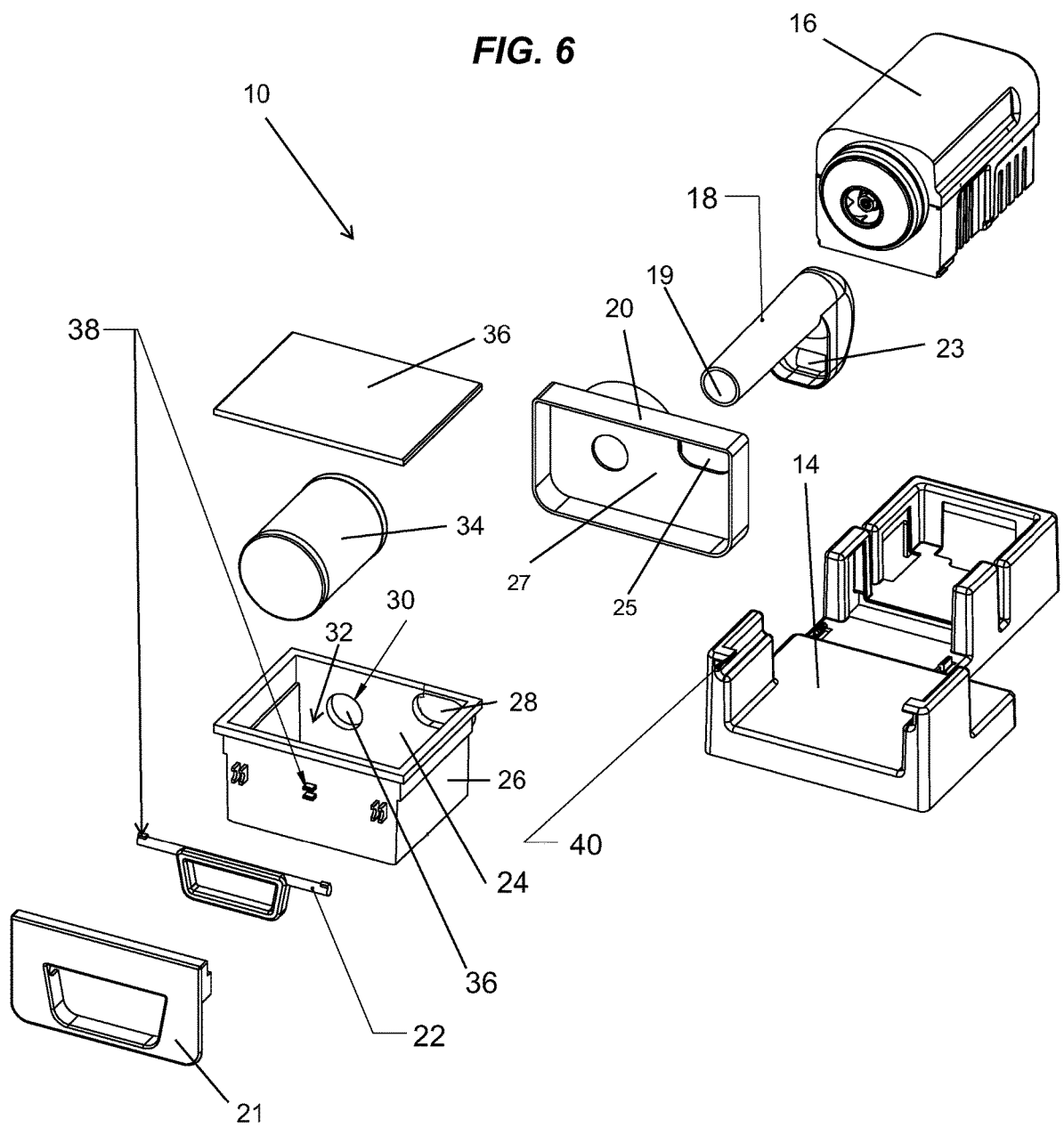
FIG. 6 is an exploded view of the vacuum cleaner assembly to be mounted in a vehicle according to a first aspect of the present disclosure.

Referring now to FIG. 6, an exploded view of the vacuum cleaner assembly 10 according to the present disclosure is depicted. As previously described, the vacuum unit 12 of the vacuum cleaner assembly 10 includes the power unit 16 to generate a vacuum for collecting debris within a vehicle, for example. The power unit 16 is coupled to the hose junction 18, which is in turn coupled to a hose or other vacuuming accessory (not pictured). The hose junction 18 is also coupled to the chassis 20 at a back of the chassis 20.

The chassis 20 is secured to a back wall 24 of a canister 26, such that the canister 26 is coupled to the power unit 16. The back wall 24 of the canister 26 includes a dirty air port 28 and a clean air port 30. The power unit 16 and the hose junction 18 are configured such that a vacuum generated by the power unit 16 is transmitted to the hose junction 18. In turn, the hose junction 18 transmits the suction generated by the power unit 16 through a hose or other vacuuming accessory (not pictured) to areas in need of vacuuming, for example. The hose junction 18 turns debris 180 degrees to enter the back of the canister 26. The hose junction 18 transmits the debris through the chassis 20 via dirty air aperture 25 in a rear surface 27 of the chassis and then through the back wall 24 of the canister 26 and into the canister 26. Specifically, the one or more of dirty air and debris travels through the dirty air port 28 in the back wall 24 of the canister 26.

The canister 26 defines a cavity 32. A cartridge filter 34 is secured within the cavity 32 of the canister 26. After reaching the canister 26, the one or more of dirty air and debris travels through the cartridge filter 34. In one example, large debris in the dirty air that is too large to enter the cartridge filter 34 is retained within the canister 26. In addition, and in another example, smaller debris enters the cartridge filter 34 and may be removed from the air flow by the cartridge filter 34. Air that has been cleaned by the cartridge filter 34 is expelled from the canister 26 through the clean air port 30.

The canister 26 is mounted to the mounting plate 14 in a manner that allows the canister 26 to slide in and out horizontally. Easy removal of the canister 26 permits debris to be dumped out of the canister 26 and also facilitates replacement of the cartridge filter 34. In addition to the mounting plate 14, the canister 26 is surrounded by a lid 36 and, as previously discussed, a front panel 21 that includes a handle latch 22. In this example, at least a portion of the handle latch 22 is accessible through the front panel 21. Tabs 38 lock the handle latch 22 in place when in a vertical position (depicted in FIG. 6) and detent in place in a horizontal position. When the handle latch 22 is in the vertical position, the tabs 38 on the end lock the canister 26 to the mounting plate 14. An undercut 40 of the mounting plate 14 works with the handle latch tabs 38 to lock the canister 26 in place. When the handle latch 22 is in a horizontal position, the tabs 38 disengage, allowing the canister 26 to be pulled out.

Referring now to FIGS. 7-12, a vacuum cleaner assembly 100 according to a second aspect of the present disclosure is depicted. The vacuum cleaner assembly 100 includes a vacuum unit 112 and a mounting plate 114, and the vacuum unit 112 is coupled to the mounting plate 114. As with the vacuum cleaner assembly 10, the vacuum cleaner assembly 100 is configured to be installed and operated within a vehicle, such as a sports utility vehicle or other type of vehicle. However, unlike the vacuum cleaner assembly 10 of FIGS. 1-5, the vacuum cleaner assembly 100 includes a chassis 120 that is positioned above a canister assembly 117 adjacent to a lid 136 of the chassis 120 as opposed to the chassis 20 secured to the back wall 24 of the canister 26. The hose junction 118 for the vacuum cleaner assembly 100 turns debris only approximately 90 degrees instead of the 180 degrees that the hose junction 18 turns debris. Further, the vacuum cleaner assembly 100 includes a pre-filter 142.

Figure 7:
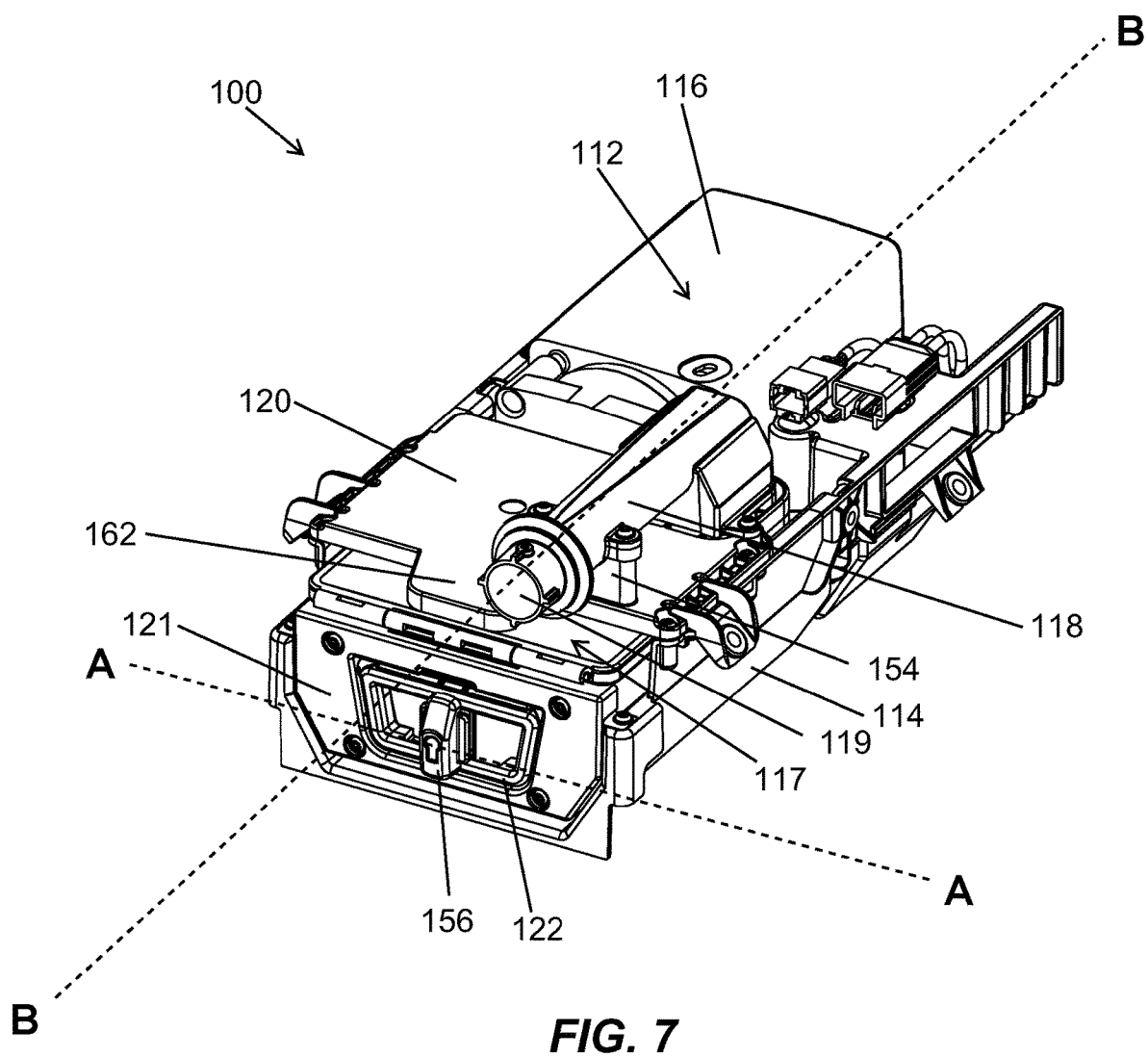
FIG. 7 is an isometric view of a vacuum cleaner assembly to be mounted in a vehicle according to a second aspect of the present disclosure.
Figure 8:
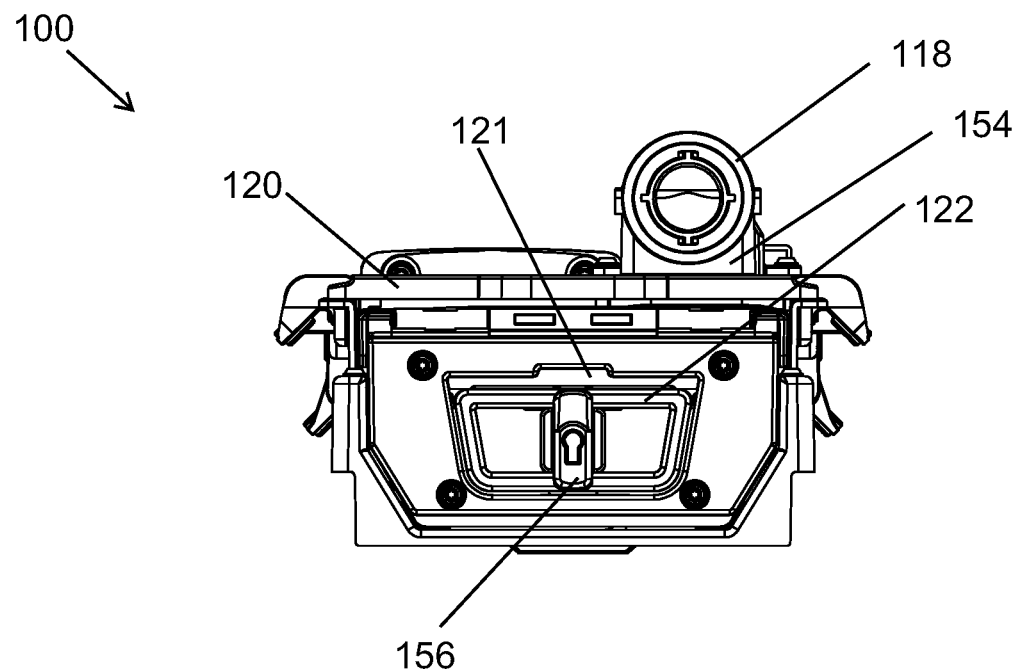
FIG. 8 is a front view of the vacuum cleaner assembly of FIG. 7.
Figure 9:
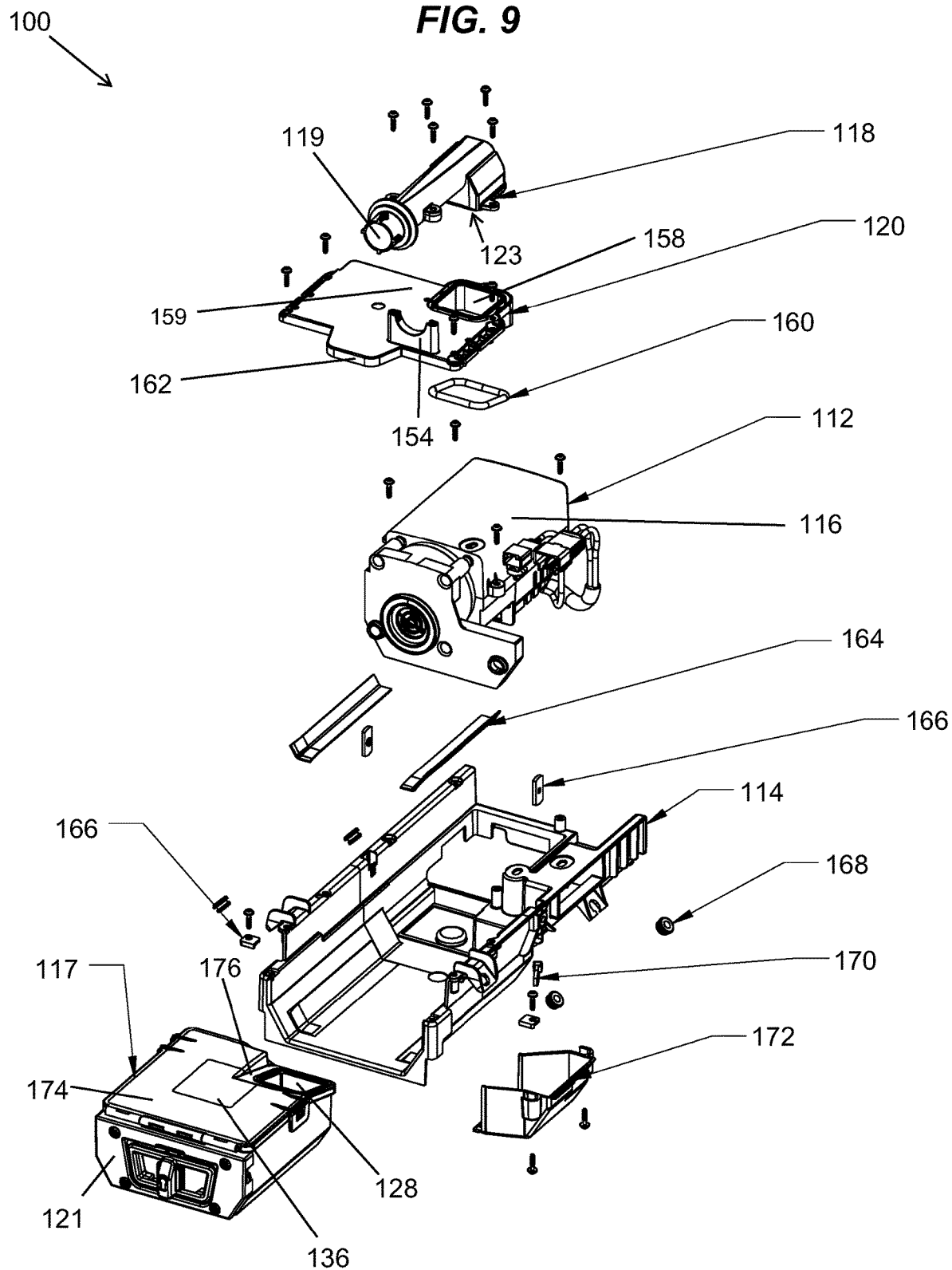
FIG. 9 is an exploded view of the vacuum cleaner assembly to be mounted in a vehicle according to a second aspect of the present disclosure.

As shown in FIGS. 7-9, the vacuum cleaner assembly 100 includes a canister assembly 117, which is disposed on the mounting plate 114 with the vacuum unit 112. The vacuum unit 112 is configured to draw a vacuum. The canister assembly 117 is configured to collect debris and is coupled to the vacuum unit 112. The canister assembly 117 is slidably mounted in the mounting plate 114. That is, the canister assembly 117 is configured to be in an in-use position where it is fully disposed on the mounting plate 114 and forms a pathway with other components of the vacuum cleaner assembly. The canister assembly 117 is also configured slide away from the power unit 116 and be removed from the mounting plate 114 to, for example, dump accumulated debris out.

As shown in FIG. 7, a power unit 116 is operably connected to a canister assembly 117, which is secured by a chassis 120 to a hose junction 118. The power unit 116 creates a vacuum operation of the vacuum cleaner assembly 100. The hose junction 118 permits the vacuum cleaner assembly 100 to be connected to a variety of vacuum accessories, such as a vacuum head or brush, at or near the first dirty air opening 119 of the hose junction 118. The hose junction 118 is configured to serve as a pathway for debris.

The hose junction 118, as shown in FIGS. 8 and 9, is supported on the chassis 120 by a hose support 154. The hose support 154 may have a complementary shape to the hose junction 118. For example, the hose support 154 may have a semi-circular cut out upon which the hose junction 118 may rest. Alternately, the hose support 154 may have clips, fasteners, hooks, or other support structures by which the hose junction 118 is held in place relative to the chassis 120. Support for the hose junction 118 is useful when vacuuming so that movement of any accessory attached to the hose junction 118 does not jerk the hose junction 118 ajar from the chassis 120, which could lead to sealing problems with the pathway of the vacuum cleaner assembly 100.

Figure 10:
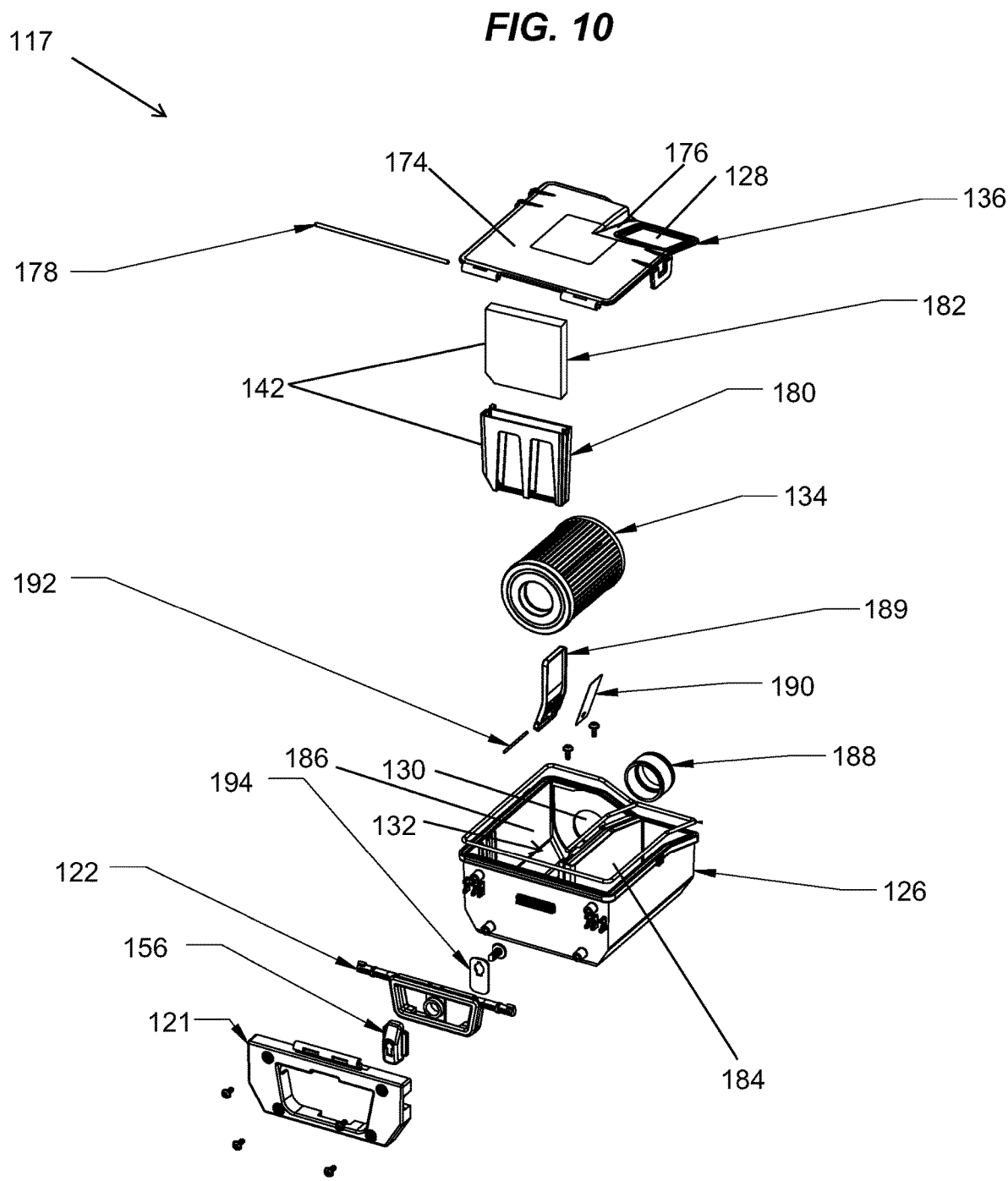
FIG. 10 is another exploded view of the vacuum cleaner assembly describing additional features of the vacuum cleaner assembly according to a second aspect of the present disclosure.

As also shown in FIGS. 9 and 10, the canister assembly 117 is secured on the mounting plate 114 by a front panel 121 and a handle latch 122. The handle latch 122 includes a latch lock 156. Further details about the operation of the front panel 121 and handle latch 122 are provided below and are also disclosed in U.S. Provisional Application No. 62/822,595 filed Mar. 22, 2019, the entire contents of which are hereby incorporated by reference.

An exploded view of the vacuum cleaner assembly 100 in FIG. 9, as well as an exploded view of the canister assembly 117 in FIG. 10, provides a comprehensive understanding of the arrangement and operation of the vacuum cleaner assembly 100. As shown in FIG. 9, the hose junction 118 has a first dirty air opening 119 and a second dirty air opening 123. The first dirty air opening 119 is disposed perpendicular to the second dirty air opening 123. Any vacuum accessories (not pictured) are attached to the hose junction 118 at or near the first dirty air opening 119. The hose support 154, discussed above, extends from the chassis 120 to support the hose junction 118 near the first dirty air opening 119.

As shown in FIG. 9, the second dirty air opening 123 of the hose junction 118 is aligned with a dirty air aperture 158 on a rear surface 159 of the chassis 120. The chassis 120 secures the hose junction 118 to the canister assembly 117. The second dirty air opening 123 of the hose junction 118 and the dirty air aperture 158 of the chassis 120 are also aligned with the dirty air port 128 of the canister assembly 117. The chassis 120 is configured to fluidly connect the second dirty air opening 123 of the hose junction 118 to the dirty air port 128 of the canister assembly 117. A worm gasket 160 may be provided between the dirty air aperture 158 of the chassis 120 and the dirty air port 128 of the canister assembly 117 to promote a better seal between the chassis 120 and the canister assembly 117. Alternately, other sealing features, such as sealing material, may be provided directly on the chassis 120 or the canister assembly 117 to promote the seal at the dirty air aperture 158 and the dirty air port 128. The chassis 120 may include a projection 162 that extends toward the front of the canister assembly 117, such as where the canister assembly 117 meets the front panel 121. This projection 162 may be designed to complement panels or other interior features of the vehicle in which the vacuum cleaner assembly 100 is mounted.

As further shown in FIG. 9, the mounting plate 114, which may be fixedly mounted in a vehicle, has the vacuum unit 112 (including power unit 116) and the canister assembly 117 disposed thereon. One or more felt strips 164 may be placed between the vacuum unit 112 and the mounting plate 114 to provide cushion and reduce rattling of the vacuum cleaner assembly 100, particularly when the vehicle is in motion. Various securement mechanisms may hold the vacuum unit 112 and the canister assembly 117 to the mounting plate 114, including but not limited to nuts 166, grommets 168, and cable ties 170. An exhaust cover 172 may be connected to the vacuum cleaner assembly 100.

The canister assembly 117, depicted in FIG. 9, is shown in greater detail in FIG. 10. The canister assembly 117 includes a dirty air port 128, a clean air port 130, a canister 126, a lid 136, and a cavity 132 defined by the canister 126. The lid 136 has a first surface 174 disposed in a first plane, which is adjacent to the chassis 120 when the vacuum cleaner assembly 100 is fully assembled. In addition, the lid 136 has a second surface 176 disposed in a second plane and including the dirty air port 128. The lid 136 may be connected to the canister 126 by, for example, a pin 178. The chassis 120 is secured to the canister 126 above the lid 136.

Within the cavity 132 of the canister 126, a pre-filter 142 and a cartridge filter 134 are arranged. The pre-filter 142 may include a pre-filter chassis 180 that surrounds foam 182. Further details about the pre-filter 142 may be found in U.S. Provisional Application No. 62/752,743 filed Oct. 30, 2018, the entire contents of which are hereby incorporated by reference. The pre-filter 142 and the canister 126 together define a first chamber 184 and a second chamber 186, shown best in FIG. 16. As further depicted in FIG. 10, the first chamber 184 is connected to the dirty air port 128. The second chamber 186 is connected to the clean air port 130, and the cartridge filter 134 is disposed in the second chamber 186. Specifically, the cartridge filter 134 may be mounted on a filter mount 188 to surround the clean air port 130.

Still referring to FIG. 10, other components of the canister assembly 117 include an interlock 189 having an interlock spring 190 and an interlock pin 192. Additionally, as discussed above, a front panel 121 and a handle latch 122 may be included in the canister assembly 117. The front panel 121 may at least partially surround the handle latch 122. A latch lock 156 and a latch lock blade 194 may be connected to the handle latch 122 for locking the handle latch 122.

Referring now to FIG. 11, details of the power unit 116 of the vacuum cleaner assembly 100 are depicted. Specifically, the power unit 116 includes a motor/impeller unit 144 within a motor housing 146. The motor housing 146 has an outer shell with a generally elongate rectangular form. However, the motor housing 146 may take many different forms and shapes and sizes depending upon the particular space needs and/or arrangements desired for installation in a particular vehicle and still fall within the scope of the present disclosure. The motor/impeller unit 144 includes a motor 148 that drives an impeller assembly 150, and a controller 152 that controls the motor 148. The motor 148 can be of any design suitable for vacuum cleaners, including standard motors with brushes or brushless motors, and switched reluctance motors. The impeller assembly 150 may take any form suitable for moving air in a manner that will create a vacuum. In this arrangement, the impeller assembly 150 includes three in-line impellers. However, other forms of the impeller assembly 150 may also be used. The motor 148 is operatively coupled to the impeller assembly 150 to drive the impellers to create a vacuum. The controller 152 includes suitable electronics, such as a PCB board and/or other appropriate electronic control circuits configured to control the motor 148. The motor housing 146 includes an intake opening (not depicted) that forms a duct receiver and an air inlet for air that is drawn into the impeller assembly. As with the power unit 16 in vacuum cleaner assembly 10, the power unit 116 may include a battery, possibly rechargeable, or may be hardwired into the vehicle so as to draw electrical power from the vehicle. In addition, and as will be appreciated, the power unit 16 of the vacuum cleaner assembly 10 likewise includes the same components of the power unit 116 described above.

Turning to FIG. 12, a surface 196 of the chassis 120 is shown. The dirty air port 128 of the canister 126 is disposed at an angle relative to the surface 196 of the chassis 120 to facilitate placement and removal of the canister assembly 117. As a result, when the canister 126 is pulled out (to the left, in FIG. 12) from the mounting plate 114, neither the first side 198 nor the second side 200 of the worm gasket 160 (shown in FIG. 9) is in contact with the canister 126. This allows the canister 126 to slide within the mounting plate 114 without undue friction, such as the friction that would be created by contact with, for example, a rubber surface (such as that of a worm gasket 160). When the canister 126 is pushed back into an assembled position (as shown in FIG. 12), the dirty air port 128 of the canister contacts the first side 198 and the second side 200 of the worm gasket 160 nearly simultaneously, creating a seal around the dirty air port 128 to improve operation of the vacuum cleaner assembly 100. The first side 198 of the worm gasket 160 closer to the first surface 174 of the lid 136 than the second side 200 of the worm gasket 160 is when the vacuum cleaner assembly 100 is assembled.

Although depicted with a worm gasket 160, in other arrangements not shown, a sealing material may be directly adhered or attached to the chassis 120 at or around the area that comes into contact with the dirty air port 128. The benefit would be the same. The angle of the dirty air port 128 relative to the surface 196 of the chassis 120 may be greater than or equal to fifteen degrees in some arrangements, though angle less than fifteen degrees may fall within the scope of the present disclosure.

As best shown by a combination of FIGS. 9, 11, and 12, the vacuum cleaner assembly 100 includes a pathway whereby a fluid (such as air containing debris) enters the first dirty air opening 119 of the hose junction 118, exits the second dirty air opening 123 of the hose junction 118, passes through the dirty air aperture 158 of the chassis 120, enters the cavity 132 of the canister 126 via the dirty air port 128 of the canister 126, and exits the canister 126 via the clean air port 130 after traveling through the cartridge filter 134. More specifically, the pathway allows air to enter the first chamber 184 of the cavity 132 via the dirty air port 128 of the canister 126 and then enter the second chamber 186 of the cavity 132 after traveling through the pre-filter 142.

In view of the foregoing, various advantages of the vacuum cleaner assembly 10, 100 of the present disclosure will be appreciated. For example, the vacuum cleaner assembly 10, 100 allows debris to be emptied easily by sliding out a canister 26, 126 on a mounting plate 14, 114. Likewise, the replacement of filters, such as filter 34, 134, and 142, is facilitated by the sliding action of the vacuum assembly 10, 100. When the canister 26, 126 is returned to the vacuum cleaner assembly 10, 100, the vacuum cleaner assembly 10, 100 maintains a sealed pathway through which dirty air can be cleaned without undue effort on the part of the user. This prevents the undesirable leaking of debris during vacuuming. Moreover, the vacuum cleaner assembly 10, 100 is compact and can be configured for placement in a variety of vehicles.

While certain vacuum cleaner assemblies have been described herein in accordance with the teachings of the present disclosure, the scope of coverage of this patent is not limited thereto. On the contrary, while the invention has been shown and described in connection with various examples, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur.

In addition, the following additional considerations apply to the foregoing discussion. As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A vacuum cleaner assembly configured to be mounted in a vehicle, the vacuum cleaner assembly comprising:
a vacuum unit configured to draw a vacuum, the vacuum unit including a power source;
a canister assembly configured to collect debris and coupled to the vacuum unit, the canister assembly including a canister having a dirty air port;
a hose junction configured to serve as a pathway for debris, the hose junction including a first dirty air opening and a second dirty air opening; and
a chassis configured to fluidly connect the second dirty air opening of the hose junction to the dirty air port of the canister, the chassis including a dirty air aperture and a surface;
wherein the dirty air port of the canister is disposed at an angle relative to the surface of the chassis to facilitate placement and removal of the canister assembly.

2. The vacuum cleaner assembly of claim 1, wherein the angle of the dirty aperture of the canister relative to the surface of the chassis is greater than or equal to fifteen degrees.

3. The vacuum cleaner assembly of claim 1, wherein a worm gasket is provided between the dirty air port of the canister assembly and the dirty air aperture of the chassis to provide a seal.

4. The vacuum cleaner assembly of claim 1, wherein the first dirty air opening of the hose junction is disposed perpendicular to the second dirty air opening of the hose junction.

5. The vacuum cleaner assembly of claim 1, further comprising a mounting plate, the canister assembly and the vacuum unit being disposed on the mounting plate.

6. The vacuum cleaner assembly of claim 5, wherein the canister assembly is slidably mounted in the mounting plate.

7. The vacuum cleaner assembly of claim 1, wherein the chassis further comprises a hose support configured to support the hose junction.

8. The vacuum cleaner assembly of claim 1, wherein the canister assembly includes a lid and the dirty air port is located in the lid.

9. The vacuum cleaner assembly of claim 8, wherein the lid includes a first surface adjacent to the surface of the chassis when the vacuum cleaner assembly is assembled, and a second surface comprising the dirty air port.

10. The vacuum cleaner assembly of claim 9,
wherein a worm gasket is provided between the dirty air port of the canister assembly and the dirty air aperture of the chassis to provide a seal,
wherein the worm gasket has a first side and a second side, and
wherein the first side of the worm gasket is closer to the first surface of the lid than the second side of the worm gasket is when the vacuum cleaner assembly is assembled.

11. A vacuum cleaner assembly configured to be mounted in a vehicle, the vacuum cleaner assembly comprising:
a vacuum unit configured to draw a vacuum, the vacuum unit including a power source;
a canister assembly configured to collect debris and coupled to the vacuum unit, the canister assembly including
a canister defining a cavity and including a dirty air port and a clean air port;
a cartridge filter disposed within the cavity of the canister and surrounding the clean air port;
a hose junction configured to serve as a pathway for debris, the hose junction including a first dirty air opening and a second dirty air opening;
a chassis connecting the hose junction to the canister assembly, the chassis including a dirty air aperture between the second dirty air opening of the hose junction and the dirty air port of the canister; and
a mounting plate, the canister assembly and the vacuum unit being disposed on the mounting plate;
wherein the vacuum cleaner assembly includes a pathway whereby a fluid enters the first dirty air opening of the hose junction, exits the second dirty air opening of the hose junction, passes through the dirty air aperture of the chassis, enters the cavity of the canister via the dirty air port of the canister, and exits the canister via the clean air port after traveling through the cartridge filter.

12. The vacuum cleaner assembly of claim 11, further comprising
a pre-filter disposed in the cavity of the canister, the pre-filter and the canister together defining a first chamber and a second chamber of the cavity;
wherein the cartridge filter is disposed within the second chamber of the cavity; and
wherein the pathway allows air to enter the first chamber of the cavity of the canister via the dirty air port of the canister and enter the second chamber of the cavity of the canister after traveling through the pre-filter.

13. The vacuum cleaner assembly of claim 11, wherein the dirty air aperture of the chassis is disposed on one of a top surface of the chassis or a rear surface of the chassis.

14. The vacuum cleaner assembly of claim 11,
wherein the canister assembly is slidably mounted in the mounting plate, and
wherein the dirty air port of the canister assembly is disposed at an angle relative to the surface of the chassis to facilitate placement and removal of the canister assembly during debris removal from the canister assembly.

15. The vacuum cleaner assembly of claim 11, wherein the canister assembly further includes a front panel connected to the canister and a handle latch connected to the canister and surrounded in part by the front panel.

16. The vacuum cleaner assembly of claim 15, wherein the canister assembly further comprises a latch lock and a latch lock blade connected to the handle latch for locking the handle latch.

17. The vacuum cleaner assembly of claim 15, wherein the canister includes a lid, the chassis is secured to the canister above the lid, and the chassis includes a projection extending toward the front panel of the canister.

18. The vacuum cleaner assembly of claim 11, wherein the hose junction is configured to turn the pathway 180 degrees between the first dirty air opening and the second dirty air opening.

19. The vacuum cleaner assembly of claim 11, wherein the canister includes a back wall and the chassis is secured to the back wall of the canister and to the vacuum unit.

20. The vacuum cleaner assembly of claim 11, wherein the canister includes a lid, and wherein the chassis is secured to the canister above the lid.

21. The vacuum cleaner assembly of claim 11, wherein the hose junction is configured to turn the pathway 90 degrees between the first dirty air opening and the second dirty air opening.

* * * * *